Aug. 7, 1934.  W. R. HEWTON  1,969,696
MEASURING DEVICE FOR YARN WINDING MACHINES AND THE LIKE
Filed March 30, 1933  2 Sheets-Sheet 1
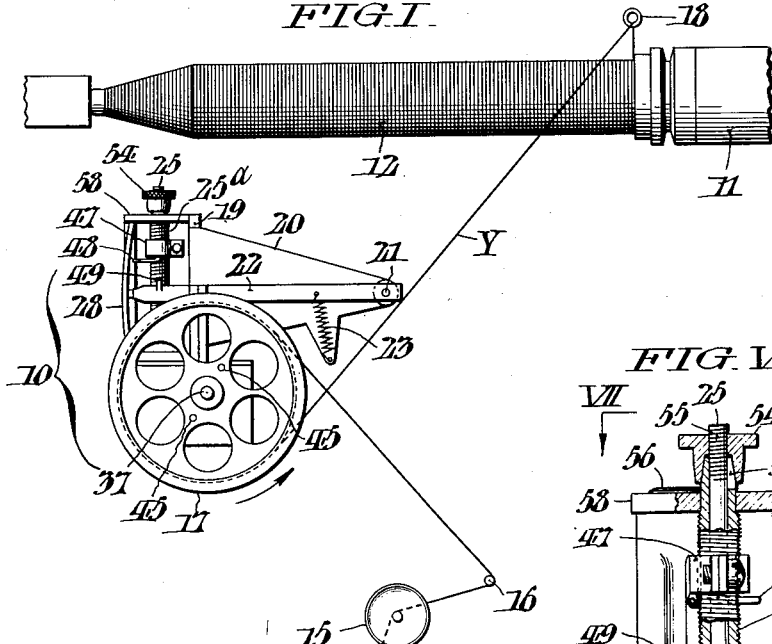
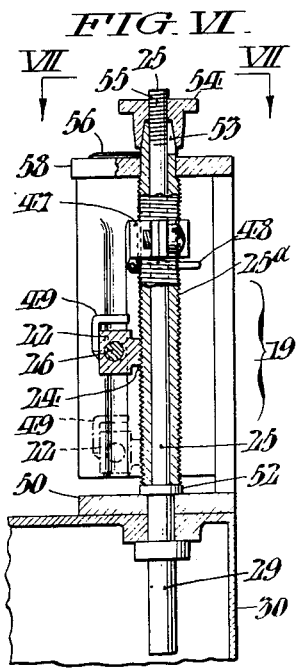
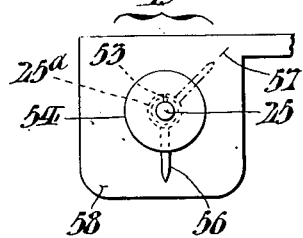
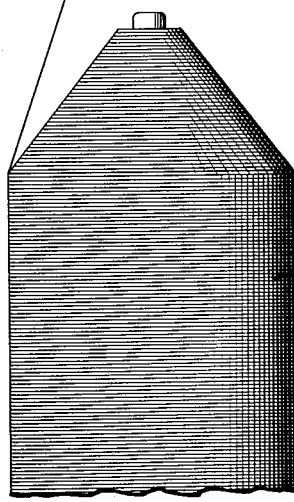
INVENTOR:
William R. Hewton,
BY Fraley & Paul
ATTORNEYS.

Aug. 7, 1934.　　W. R. HEWTON　　1,969,696
MEASURING DEVICE FOR YARN WINDING MACHINES AND THE LIKE
Filed March 30, 1933　　2 Sheets-Sheet 2
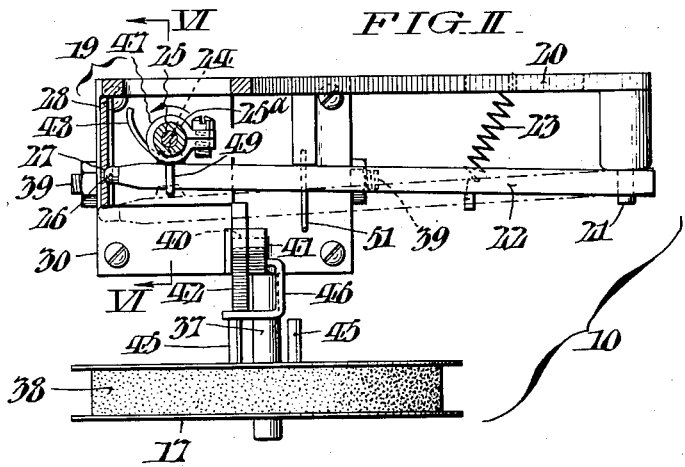
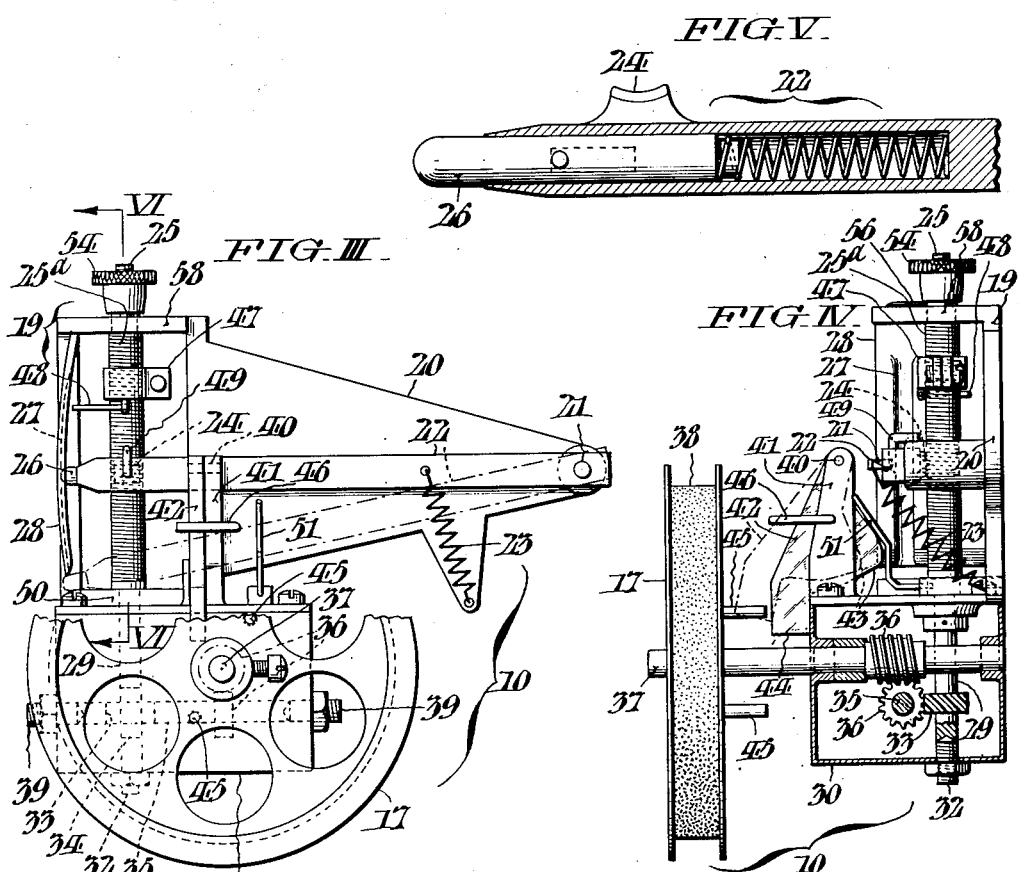
INVENTOR:
William R. Hewton,
BY Fraley Paul
ATTORNEYS.

Patented Aug. 7, 1934

1,969,696

UNITED STATES PATENT OFFICE

1,969,696

MEASURING DEVICE FOR YARN WINDING MACHINES AND THE LIKE

William R. Hewton, Philadelphia, Pa., assignor to Collins & Aikman Corporation, Philadelphia, Pa., a corporation of Delaware Application March 30, 1933, Serial No. 663,502

13 Claims. (Cl. 33—136)

This invention relates to devices useful in measuring continuous strand or sheet materials incident to winding thereof on rotating core elements; and it has reference more particularly to measuring devices for yarn winding machines.

The chief aim of my invention is to make it possible to measure with positive accuracy, a definite length of yarn for the bobbins successively wound in machines of the sort referred to. This desideratum I attain as hereinafter fully disclosed, through provision of a simple and efficient measuring device with a traction wheel driven by the yarn enroute to the winding spindle of the machine, and means automatically operative after a predetermined number of rotations of said wheel to suddenly stop it and cause rupture of the yarn to prevent further delivery thereof to the bobbin.

A further aim of my invention is to provide in connection with a measuring device having the above indicated attributes, adjustment facilities whereby the measured length of yarn may be varied as desired or required for bobbins of different sizes or capacities.

Still other objects and attendant advantages of this invention will be manifest from the detailed description which follows of the attached drawings, wherein Fig. I is a diagrammatic view showing the relation of my improved yarn measuring device to the bobbin spindle of a winding machine.

Fig. II is a view on a larger scale showing the device in plan.

Fig. III is a side elevation of the device.

Fig. IV shows the device in end elevation as viewed from the right of Fig. III.

Fig. V is a fragmentary longitudinal sectional view of one of the elements of the device drawn to a still larger scale.

Fig. VI is a fragmentary vertical section taken as indicated by the arrows VI—VI in Figs. II and III; and Fig. VII is a fragmentary plan view taken as indicated by the arrows VII—VII in Fig. VI.

In Fig. I, I have designated my improved measuring device comprehensively by the numeral 10, the same being fixedly attached to the frame (not shown) of the winding machine at a level below the spindle 11 for the bobbin 12. Enroute upward from the supply package indicated at 13, the yarn Y which is being wound upon the bobbin 12 passes between a pair of tension disks 15, then over a directional guide 16, then once about the traction wheel 17 of the measuring device 10 and finally through the traversing guide eye 18 by which the yarn is distributed uniformly along the length of said bobbin.

Referring now more particularly to Figs. II-V, it will be observed that my improved measuring device comprises an attaching frame 19, with a lateral extremity 20 to the end of which is loosely fulcrumed at 21 with capacity for universal pivotal movement, a horizontal arm 22 which constitutes a follower and which is subject to a helical tension spring 23. Adjacent its outer end the arm 22 has a toothed side projection 24 (Fig. V) adapted to engage the threads of a vertical screw shaft 25 which is journalled top and bottom in the bracket 19. Normally this engagement is yieldingly maintained through guidance of an outwardly spring-pressed plunger 26 in the end of the arm 22 (Fig. V) within the vertical groove 27 of a fixed track 28 which is curved concentrically with the fulcrum center 21 of said arm. The lower diametrically reduced end 29 of the screw shaft 25 extends into a gear housing 30 secured to the bottom of the bracket 19, and, as shown in Fig. III, is supported by an adjustable needle point bearing screw 32. Fast on the nether portion 29 of the shaft 25 within the housing 30 is a miter pinion 33 which meshes with a companion pinion 34 on a counter-shaft 35. This counter-shaft 35 is driven, through a worm and gear couple 36, from the shaft 37 whereto is secured the traction wheel 17 of the measuring device, the periphery of said wheel having an abrasive surface, which is conventionally indicated at 38 in Figs. II and IV, for assurance against slipping relative to the yarn Y. From Fig. III it will be observed that the counter-shaft 35, like the bottom end 29 of the screw shaft 25, is supported at its ends by needle point bearing screws 39. By the gear system just described, it is obvious that motion is communicated to the screw shaft 25 from the drive wheel 17 at reduced speed, the effort necessary to drive the device being practically nil as regards strain upon the yarn Y due to the lightness and delicacy of the moving parts.

Freely suspended from a pivot 40 (Fig. IV) atop an upright extremity 41 of the bracket 19 is a trip member 42 which has an inward cam projection 43 designed to cooperate with the lever 22, and a downward projection 44, which, as said trip member is swung to the dot and dash line position as hereinafter more fully explained engages laterally projecting pins 45 on the traction wheel 17 of the device. The distribution of the weight of the trip member 42 is such that the pendant projection 44 thereof normally abuts against the side of the gear casing 30 out of the way of the pins 45 on the drive wheel. A guard 46 serves to limit the outward swing of the trip member 42. Adjustable along the screw 25 is a split clamp collar 47 with a wing-like projection 48 adapted to cooperate with an upward lug 49 on the lever 22 also as later on set forth.

The operation of the measuring device is as follows: Under the pull of the yarn Y as it is taken from the supply package 13 and wound onto the bobbin 12, the traction wheel 17 of the device is rotated in the direction of the arrow in Fig. I and through the gearing hereinbefore described, slow rotative movement is transmitted to the screw-shaft 25 in the direction of the arrow in Fig. II. As a consequence, the follower arm 22 is slowly elevated from the starting position indicated in dot and dash lines in Fig. III against the pull of the tension spring 23. When the lug 49 on the arm 22 finally reaches the level of the cam wing 48 on the collar 47, said wing, in wiping against the projection, forces the lever outward with attendant withdrawal of its threaded projection 24 from the screw shaft 25, and dislodgment of the spring-pressed plunger 26 of the arm sidewise from the groove 27 in the guide track 28 and transposal thereof beyond the outer edge of the track as shown in dot and dash lines in Fig. II. Upon being thrust away from the screw shaft 25 in the manner explained the arm 22 is immediately pulled down by its spring 23 until its end strikes the bottom ledge of the bracket 50. In dropping, the arm 22 encounters the cam projection 43 of the trip member 42 which is accordingly thrust outward to the position shown in dot and dash lines of Fig. IV into the path of the pins 45 on the drive wheel 17. The measuring device is thus suddenly stopped so that, under the continuing pull of the rotating bobbin 12, the yarn Y is ruptured. As the arm 22 strikes the bottom ledge 50 of the bracket 19, it is drawn inward (its plunger end 26 clearing the guide 28, which, as shown in Fig. III, terminates short of the ledge 50) through the combined action of the spring 23 and an upwardly projecting spring finger 51 anchored in the bracket 19. The toothed projection 24 of the follower arm 22 is thus automatically reengaged with the screw-shaft 25 in readiness for another winding cycle. Upon removal of the filled bobbin 12 and replacement of an empty bobbin and threading of the measuring device as before, the machine is re-started for repetition of the operation. Obviously by adjusting the position of the collar upward or downward along the screw shaft 25 a greater or lesser amount of yarn may be predetermined for each winding.

Due to various causes, the yarn will sometimes break during a winding operation, and since knots or splices are objectionable or deleterious to subsequent weaving or knitting of the yarn, it is necessary to start the winding operation anew. Under these circumstances the operator stops the machine, replaces the partly wound bobbin with a new one, and withdraws the follower arm 22 from engagement with the screw 25 and the guide 28, whereupon said arm drops to the dot and dash line position of Fig. III as in automatic operation of the device after the complete winding of a bobbin. Now, in order to insure, upon restarting, that the teeth on the projection 24 of the follower arm 22 engage the screw threads of the shaft 25 at exactly the same circumferential point as before to predetermine winding of an exact length of the yarn on the next package, I make provisions as follows:

As shown in Fig. VI, the threaded portion of the shaft 25 is in the form of a sleeve 25a whereof the lower end rests in an integrally-formed collar 52 that bears against the lower ledge 50 of the bracket 19. The upper end of the sleeve 25a is split and tapered as at 53 to fit an internally tapered knurled jamb nut 54 which screws onto the threaded protruding top end 55 of the shaft 25. Thus, when the jamb nut 54 is tightened, the sleeve 25a is clamped against rotating independently of the shaft 25 during normal operation of the device. Projecting laterally from the upper end of the screw sleeve 25a, is a pointer 56, which, after loosening of the thumb nut 54 for the purposes of resetting of the device upon accidental breaking of the yarn during a winding operation, is swung around to register with a mark 57 on the upper ledge 58 of the bracket 19 as shown in dot and dash lines in Fig. VII; whereupon the jamb nut is retightened to secure the sleeve to the shaft 25. In this way, the threaded sleeve 25a is rotatively adjusted relative to the shaft 25 so that the same circumferential point of its thread is positioned opposite the toothed projection 24 of the follower arm 22, with resultant determination of the same uniform prescribed length of yarn for the next bobbin wound on the machine. The adjustment feature just described is furthermore advantageous in that it enables resetting of the device with a minimum loss of time. Its absence would obviously entail reverse spinning of traction wheel by hand to bring the screw of the shaft into proper relation circumferentially with the toothed projection 24 of the follower arm 22.

Having thus described my invention, I claim:

1. A measuring device for yarn winding machines and the like comprising a traction wheel about which the yarn passes enroute to the receiving spindle of the machine; a screw shaft driven by the wheel; a follower normally in engagement with the screw shaft; means operative to automatically release the follower from the screw shaft after a predetermined number of revolutions of the latter; and means actuated by the follower upon its release as aforesaid to suddenly stop the traction wheel and thereby cause rupture of the yarn.

2. A measuring device for yarn winding machines and the like comprising a traction wheel about which the yarn passes enroute to the receiving spindle of the machine; a screw shaft driven by the wheel; a follower arm fulcrumed with capacity for limited universal movement and having a toothed projection to normally engage the threads of the screw shaft; means functional to automatically dislodge the follower arm from the screw shaft after a predetermined number of rotations of the latter; and means actuated upon release of the follower arm to suddenly stop the wheel and thereby cause rupture of the yarn.

3. A measuring device for yarn winding machines and the like comprising a traction wheel about which the yarn passes enroute to the receiving spindle of the machine; a screw shaft driven by the wheel; a follower arm fulcrumed with capacity for limited universal movement and having a toothed projection to engage the threads of the screw shaft; means automatically operative to dislodge the arm from the screw shaft after a predetermined number of rotations of the latter; and a trip member actuated by the follower arm upon release of said arm to engage lateral projections on the wheel, thereby to suddenly stop the wheel and cause rupture of the yarn.

4. A measuring device for yarn winding machines and the like comprising a traction wheel about which the yarn passes enroute to the receiving spindle of the machine; a screw shaft driven by the wheel; a follower arm fulcrumed with capacity for limited universal movement and having a toothed projection to engage the threads of the screw shaft; a guide track concentrically curved with the fulcrum of the follower arm and having a groove for guidance of a spring pressed plunger in the end of said arm whereby the latter is yieldingly maintained in engagement with the screw shaft; means automatically operative upon the arm to break the aforesaid engagement with incident displacement of the spring-pressed plunger projection from the groove of the guide track after a predetermined number of rotations of the screw shaft; and means automatically actuated by the follower arm upon release thereof to suddenly stop the wheel and thereby cause rupture of the yarn.

5. A measuring device for yarn winding machines and the like comprising a traction wheel about which the yarn passes enroute to the receiving spindle of the machine; a screw shaft driven by the wheel; a follower arm fulcrumed with capacity for limited universal movement and having a toothed projection to normally engage the threads of the screw shaft; a collar adjustable along the length of the screw shaft having a lateral cam wing to dislodge the follower arm from the screw shaft after a predetermined number of revolutions of the latter; and means actuated by the follower arm upon release thereof to suddenly stop the traction wheel and thereby cause rupture of the yarn.

6. A measuring device for yarn winding machines and the like, comprising a traction wheel about which the yarn passes enroute to the receiving spindle of the machine; a screw-shaft driven by the wheel; a follower normally in engagement with the screw-shaft; means operative to automatically release the follower from the screw-shaft after a predetermined number of revolutions of the latter; means to restore the follower to starting position upon release as aforesaid; and means actuated during such restoration of the follower to suddenly stop the traction wheel and thereby cause rupture of the yarn.

7. A measuring device for yarn winding machines and the like, comprising a traction wheel about which the yarn passes enroute to the receiving spindle of the machine; a screw shaft driven by the wheel; a follower normally in engagement with the screw shaft; means operative to automatically release the follower from the screw shaft after a predetermined number of revolutions of the latter; means actuated by the follower upon release from the screw and movement thereof to restarting position, to suddenly stop the traction wheel and thereby cause rupture of the yarn.

8. A measuring device for yarn winding machines and the like, comprising a traction wheel about which the yarn passes enroute to the receiving spindle of the machine; a screw shaft driven by the wheel; a follower normally in engagement with the screw shaft; means operative to automatically release the follower from the screw-shaft after a predetermined number of revolutions of the latter; means to temporarily withhold the follower from the screw shaft upon release from the screw; yielding means to subsequently restore the follower to starting position; and means actuated by the follower incident to restoration as aforesaid to suddenly stop the traction wheel and thereby cause rupture of the yarn.

9. A measuring device for yarn winding machines and the like, comprising a traction wheel about which the yarn passes enroute to the receiving spindle of the machine; a vertical screw shaft driven by the wheel; a follower normally engaging the screw-shaft; means operative to automatically release the follower from the screw-shaft after a predetermined number of revolutions of the latter; and means actuated by the follower incident to dropping after its release, to suddenly stop the traction wheel and thereby cause rupture of the yarn.

10. A measuring device for yarn winding machines and the like, comprising a traction wheel about which the yarn passes enroute to the receiving spindle of the machine; a vertical screw shaft driven by the wheel; a horizontal follower arm fulcrumed with capacity for up and down and in and out movement, and having a toothed projection normally in engagement with the threads of the screw shaft; means functional to automatically dislodge the follower arm from the screw shaft after a predetermined number of rotations of the latter; and means actuated by the follower arm in dropping to suddenly stop the wheel and thereby cause rupture of the yarn.

11. A measuring device for yarn winding machines and the like, comprising a traction wheel about which the yarn passes enroute to the receiving spindle of the machine; a vertical screw shaft driven by the wheel; a horizontal follower arm fulcrumed with capacity for up and down and in and out movement, and having a toothed projection normally engaging the threads of the screw shaft; a vertical guide track curved concentrically with the fulcrum center of the follower arm and having a groove for guidance of a spring-pressed plunger in the end of said arm whereby the latter is normally maintained yieldingly in engagement with the screw shaft; means automatically operative upon the arm, after a predetermined number of rotations of the screw shaft, to release it from engagement with said shaft with incident lateral displacement of the spring-pressed plunger projection from the groove of the guide track beyond the side edge of the latter; means automatically actuated by the follower arm in dropping to suddenly stop the wheel and thereby cause rupture of the yarn; and spring means operative to draw the follower arm back into engagement with the screw shaft after passing of its plunger projection below the bottom end of the guide track.

12. A measuring device for yarn winding machines and the like comprising a traction wheel about which the yarn passes enroute to the receiving spindle of the machine; a shaft driven by the wheel; a threaded sleeve surrounding the shaft and normally secured against independent rotation relative to said shaft; a follower normally in engagement with the screw sleeve; means operative to automatically release the follower from the threads of the screw sleeve after a predetermined number of revolutions of the sleeve; means actuated by the follower upon its release as aforesaid to suddenly stop the traction wheel and thereby cause rupture of the yarn with resultant winding of a prescribed length of the yarn on the bobbin; and means whereby, in the event of accidental breakage of the yarn during a winding operation, the screw sleeve may be rotatively adjusted relative to the shaft for proper coordination of its threads circumferentially relative to the follower at starting to insure the same prescribed length of yarn during the next winding operation.

13. A measuring device for yarn winding machines and the like comprising a traction wheel about which the yarn passes enroute to the receiving spindle of the machine; a shaft driven by the wheel; a threaded sleeve surrounding the shaft and normally secured against independent rotation relative to said shaft; a follower normally in engagement with the screw sleeve; means operative to automatically release the follower from the threads of the screw sleeve after a predetermined number of revolutions of the sleeve; means actuated by the follower upon its release as aforesaid to suddenly stop the traction wheel and thereby cause rupture of the yarn with resultant winding of a prescribed length of the yarn on the bobbin; and means whereby, in the event of accidental breakage of the yarn during a winding operation, the screw sleeve may be rotatively adjusted relative to the shaft for proper coordination of its threads circumferentially relative to the follower at starting to insure the same prescribed length of yarn during the next winding operation, the last mentioned means including a jamb nut for securing the screw sleeve to the shaft, and a pointer on the sleeve adapted to be brought into registry with a fixed mark upon loosening of the jamb nut for resetting of the device.

WILLIAM R. HEWTON.